US012746929B2

(12) United States Patent
Deixler et al.

(10) Patent No.: US 12,746,929 B2
(45) Date of Patent: Sep. 29, 2026

(54) METHOD AND DEVICE FOR REDUCING VEHICLE VIBRATIONS

(71) Applicant: Bayerische Motoren Werke Aktiengesellschaft, Munich (DE)

(72) Inventors: Norbert Deixler, Unterhaching (DE); Martin Waldmann, Tutzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 18/844,085

(22) PCT Filed: May 23, 2023

(86) PCT No.: PCT/EP2023/063721
§ 371 (c)(1),
(2) Date: Sep. 5, 2024

(87) PCT Pub. No.: WO2023/237321
PCT Pub. Date: Dec. 14, 2023

(65) Prior Publication Data
US 2025/0178608 A1 Jun. 5, 2025

(30) Foreign Application Priority Data
Jun. 8, 2022 (DE) ..................... 10 2022 114 374.0

(51) Int. Cl.
*B60W 30/20* (2006.01)
*B60L 15/20* (2006.01)
*G07C 5/02* (2006.01)

(52) U.S. Cl.
CPC ............. *B60W 30/20* (2013.01); *B60L 15/20* (2013.01); *G07C 5/02* (2013.01);
(Continued)

(58) Field of Classification Search
CPC ............. B60W 30/20; B60W 2420/54; B60W 2510/082; B60W 2520/26;
(Continued)

(56) References Cited

U.S. PATENT DOCUMENTS

2002/0167156 A1* 11/2002 Akutagawa ............. B60L 15/20
280/757
2010/0228465 A1* 9/2010 Itabashi ................ B60W 30/20
701/104
(Continued)

FOREIGN PATENT DOCUMENTS

DE 10 2012 221 837 A1 3/2014
DE 10 2013 113 658 A1 6/2015
(Continued)

OTHER PUBLICATIONS

International Search Report (PCT/ISA/210) issued in PCT Application No. PCT/EP2023/063721 dated Aug. 28, 2023 with English translation (5 pages).
(Continued)

*Primary Examiner* — Jelani A Smith
*Assistant Examiner* — Alyssa Rorie
(74) *Attorney, Agent, or Firm* — Crowell & Moring LLP

(57) ABSTRACT

A device for reducing a vibration of a vehicle component of a vehicle, the vehicle comprising at least one electric drive machine. The device is designed to determine vibration data relating to the vibration of the vehicle component and, based on the vibration data, to determine a compensation torque in order to reduce the vibration of the vehicle component. The device is also designed to cause the drive machine to provide a total torque which comprises a driving mode torque which is to be provided for the driving mode of the vehicle and which is overlaid with the compensation torque.

7 Claims, 2 Drawing Sheets

(52) U.S. Cl.
CPC .................... *B60L 2240/423* (2013.01); *B60L 2240/465* (2013.01); *B60W 2420/54* (2013.01); *B60W 2510/082* (2013.01); *B60W 2520/26* (2013.01); *B60W 2552/40* (2020.02); *B60W 2710/083* (2013.01)

(58) Field of Classification Search
CPC ......... B60W 2552/40; B60W 2710/083; B60L 15/20; B60L 2240/423; B60L 2240/465; B60L 2270/142; B60L 2270/145; G07C 5/02
See application file for complete search history.

(56) References Cited

U.S. PATENT DOCUMENTS

| | | | | |
|---|---|---|---|---|
| 2011/0077835 | A1* | 3/2011 | Otsuka | B60W 10/10 701/99 |
| 2014/0046558 | A1 | 2/2014 | Kim | |
| 2014/0172209 | A1 | 6/2014 | Ide | |
| 2015/0362407 | A1* | 12/2015 | Hassler | B61F 5/50 105/182.1 |
| 2017/0217332 | A1* | 8/2017 | Hashimoto | H02P 29/032 |
| 2020/0118536 | A1* | 4/2020 | Valeri | G10K 11/1785 |
| 2021/0265935 | A1* | 8/2021 | Tsao | H02P 23/0004 |
| 2022/0072960 | A1* | 3/2022 | Oh | B60L 15/2054 |
| 2023/0182699 | A1* | 6/2023 | Hara | B60L 7/26 701/71 |

FOREIGN PATENT DOCUMENTS

| | | | |
|---|---|---|---|
| DE | 10 2015 006 074 | A1 | 2/2016 |
| DE | 10 2014 222 977 | A1 | 5/2016 |
| DE | 10 2017 120 175 | A1 | 3/2019 |
| DE | 10 2018 204 384 | A1 | 9/2019 |
| DE | 10 2019 209 857 | A1 | 1/2021 |
| EP | 2 815 914 | A1 | 12/2014 |

OTHER PUBLICATIONS

German-language Written Opinion (PCT/ISA/237) issued in PCT Application No. PCT/EP2023/063721 dated Aug. 28, 2023 with English translation (9 pages).
German-language Search Report issued in German Application No. 10 2022 114 374.0 dated Jan. 17, 2023 with partial English translation (11 pages).

* cited by examiner

METHOD AND DEVICE FOR REDUCING VEHICLE VIBRATIONS

BACKGROUND AND SUMMARY

This disclosure relates to a method and a corresponding device for reducing vibrations of a vehicle.

An at least partially electrically driven vehicle has an electric machine which is configured to drive and/or to decelerate the vehicle. During the operation of the vehicle, vibrations of one or more components of the vehicle can occur, in particular due to excitations of the roadway traveled by the vehicle, which are possibly perceived as unpleasant by a user of the vehicle.

The vehicle can have one or more measures which are designed to reduce such vibrations. Exemplary measures are impedance masses, vibration absorbers, rubber mounts, etc. These measures are typically linked with an additional weight and an additional installation space requirement, however.

The present disclosure relates to the technical object of reducing vibrations of one or more vehicle components of an at least partially electrically driven vehicle in an efficient and reliable manner.

According to one aspect, a device for reducing a vibration of a vehicle component of a (motor) vehicle is described. The vehicle can have a passenger compartment for one or more passengers. The vibration of the vehicle component can be perceptible, in particular audible, to a passenger of the passenger compartment. The vibration of the vehicle component can be excited by the roadway traveled by the vehicle (via the one or more wheels of the vehicle). The vehicle component can have, for example, a surface capable of vibrating (such as a metal sheet or a plastic plate). The vehicle component can be arranged and/or fastened on the body of the vehicle.

The vehicle comprises at least one electric drive machine. The drive machine can possibly be mounted directly on the body of the vehicle.

Alternatively, the drive machine can be mounted on an axle support, wherein the axle support is mounted on the body of the vehicle. Alternatively, the drive machine can be mounted on a wheel carrier of a wheel coupled to the drive machine, wherein the wheel carrier is typically mounted on the body of the vehicle. In particular, the wheel carrier can be mounted via the wheel suspension and the axle support in relation to the body of the vehicle. The mechanical coupling between the drive machine and the wheel can enable the transmission of a torque from the drive machine to the wheel (and/or in the reverse direction). The drive machine can be arranged in the vehicle such that the axis of the drive machine extends along the transverse axis of the vehicle (for example, between a right and a left wheel of the vehicle). The transverse axis of the vehicle is typically arranged perpendicularly to the longitudinal axis of the vehicle and perpendicularly to the vertical axis of the vehicle.

The device is configured to determine vibration data with respect to the vibration of the vehicle component. The vibration data can indicate the amplitude and/or the frequency of the vibration of the vehicle component.

The vibration data can be acquired by way of one or more vehicle sensors. One exemplary vehicle sensor is a microphone, which is arranged, for example, in the passenger compartment of the vehicle. Another exemplary vehicle sensor is an acceleration sensor, which is arranged, for example, on the drive machine, on the axle support for supporting the drive machine, on the body of the vehicle, and/or on the wheel carrier for the wheel coupled to the drive machine.

The device is furthermore configured to determine a compensation torque for reducing the vibration of the vehicle component on the basis of the vibration data. In particular, one or more parameters of the compensation torque can be determined here on the basis of the vibration data. The one or more parameters of the compensation torque can comprise the amplitude and/or the frequency (or the period duration) of the compensation torque.

Furthermore, the device is configured to cause a total torque to be delivered by the drive machine, wherein the total torque comprises the driving operation torque to be delivered for the driving operation of the vehicle, which is superimposed with the compensation torque. The total torque delivered by the drive machine can in particular correspond to the sum or the superposition of the driving operation torque and the compensation torque. A relatively high-frequency oscillation of the driving operation torque can be caused here by the compensation torque. In particular, the compensation torque can have a chronological mean value of zero and can be designed to oscillate at a specific frequency around the zero value.

The driving operation torque can have been specified by the driver via a control element, in particular via an accelerator pedal, and/or by a driving function for the automated longitudinal guidance of the vehicle. Furthermore, the driving operation torque can comprise a drive torque for driving the vehicle and/or a regenerative torque for decelerating the vehicle.

A device is therefore described which is designed to superimpose, during the driving operation of the vehicle, the driving operation torque, caused for the driving operation (for acceleration or for deceleration), of the one or more electric drive machines of the vehicle with a compensation torque, in order to reduce (for example, to damp and/or to absorb) a detected vibration of a vehicle component. The device thus enables the one or more electric drive machines of the vehicle to be used as active vibration absorbers (without negatively affecting the task of the one or more drive machines directed to the driving operation of the vehicle in the process). Particularly efficient and reliable reduction of vibrations in a vehicle can thus be effected.

The device can be configured to determine respectively current vibration data repeatedly, at a sequence of successive points in time. The compensation torque can then be adapted repeatedly to the respectively current vibration data. A permanent reduction of the vehicle vibrations can thus be effected.

The device can be configured to determine, on the basis of the vibration data, one or more actual values (such as an actual level) of the vibration of the vehicle component and to compare them to one or more corresponding target values (such as a target level), in order to determine a control error. The device can furthermore be configured to determine, on the basis of the control error by way of a (P, I, and/or D, i.e., Proportional-Integral-Derivative) controller, parameter values for the one or more parameters of the compensation torque. This can be repeated at a sequence of successive points in time.

A control loop can therefore be used to adapt the compensation torque to the respectively acquired vibration of the vehicle component. A particularly robust and reliable reduction of vehicle vibrations can thus be effected.

The device can be configured to determine the compensation torque, in particular the amplitude and/or the frequency of the compensation torque, in such a way that due to the inertia of the torque transmission system between the drive machine and the wheel coupled to the drive machine, the compensation torque does not result in a variation (perceptible to the user of the vehicle) of the driving speed of the vehicle. The amplitude and/or the frequency of the compensation torque can therefore depend on the inertia of the torque transmission system. The frequency can be determined here in such a way that a specific minimum frequency (such as 10 Hz) is not undershot. Alternatively or additionally, the amplitude can be determined in such a way that a specific maximum amplitude is not overshot. The possible maximum amplitude can depend on the determined frequency of the compensation torque (and typically increases with increasing frequency).

Alternatively or additionally, the device can be configured to determine the compensation torque, in particular the amplitude and/or the frequency of the compensation torque, in such a way that a rotating and/or pitching vibration of the drive machine around the wheel axle of the wheel coupled to the drive machine is effected by the compensation torque. This rotating and/or pitching vibration of the drive machine can be transmitted via the support of the drive machine to the vehicle component in order to damp and/or absorb the vibration of the vehicle component.

The compensation torque can therefore be designed to cause a vibration of the drive machine which does not have an effect on the longitudinal movement of the vehicle and/or which can be used for damping and/or absorbing the vibration of the vehicle component. A particularly comfortable vibration reduction can thus be effected.

The device can be configured to determine wheel slip data with respect to the wheel slip of a wheel coupled to the drive machine (and driven by the drive machine). The wheel slip data can be determined, for example, by way of a wheel slip estimation (which is carried out, for example, in the scope of ABS (antilock braking system)). The compensation torque, in particular the one or more parameters of the compensation torque, can then (also) be determined as a function of the wheel slip data, in particular in such a way that the wheel slip caused by the compensation torque does not exceed a predefined wheel slip threshold value. The comfort and the stability of the driving operation of the vehicle can be further increased by the consideration of wheel slip data in the determination of the compensation torque.

The device can be configured to determine coefficient of friction data with respect to the coefficient of friction of the roadway traveled by the vehicle. The coefficient of friction data can be determined by a coefficient of friction estimation. The coefficient of friction data can indicate, for example, the force and/or the torque which can be transmitted at most between the wheel and the roadway before a static friction between wheel and roadway is canceled out. The amplitude of the compensation torque can be limited as a function of the coefficient of friction data. The comfort and the stability of the driving operation of the vehicle can thus be further increased.

According to another aspect, a (road) motor vehicle (in particular a passenger vehicle or a truck or a bus or a motorcycle) is described, which comprises the device described in this disclosure.

According to another aspect, a method for reducing a vibration of a vehicle component (such as a metal sheet) of a (motor) vehicle is described, wherein the vehicle comprises at least one electric drive machine for driving (one or more wheels) of the vehicle.

The method comprises determining vibration data with respect to the vibration of the vehicle component, and determining, on the basis of the vibration data, a compensation torque for reducing the vibration of the vehicle component. In addition, the method comprises causing a total torque to be delivered by the drive machine, which comprises the driving operation torque to be delivered for the driving operation of the vehicle, which is superimposed with the compensation torque.

According to another aspect, a software (SW) program is described. The SW program can be configured to be executed on a processor (for example, on a control unit of a vehicle), and to thus carry out the method described in this disclosure.

According to another aspect, a storage medium (for example, a hard drive, ROM, RAM, memory, etc.) is described. The storage medium can comprise an SW program, which is configured to be executed on a processor and to thus carry out the method described in this disclosure.

It is to be noted that the methods, devices, and systems described in this disclosure can be used both alone and in combination with other methods, devices, and systems described in this disclosure. Furthermore, any aspects of the methods, devices, and systems described in this disclosure can be combined with one another in a variety of ways. In particular, the features of the claims can be disclosure with one another in a variety of ways. Furthermore, features set forth in parentheses are to be understood as optional features.

BRIEF DESCRIPTION OF THE DRAWINGS

The disclosure will be described in more detail hereinafter with reference to exemplary embodiments.

DETAILED DESCRIPTION OF THE DRAWINGS

Figure 1:
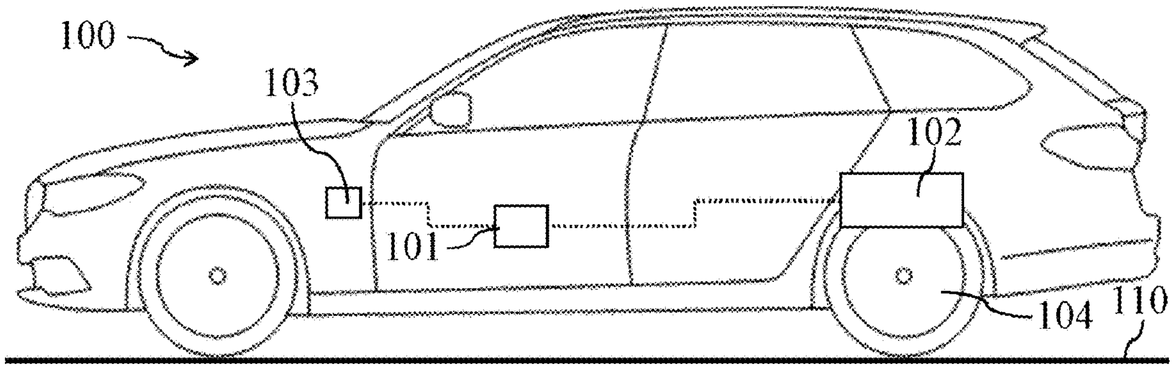
FIG. 1 shows an exemplary vehicle having an electric drive machine.

As described at the outset, the present disclosure relates to the efficient and reliable reduction of vibrations of a vehicle component of an at least partially electrically driven vehicle. In this context, FIG. 1 shows an exemplary vehicle 100 having an electric drive machine 102, which is configured to drive one or more wheels 104 of the vehicle 100. The user, in particular the driver, of the vehicle 100 can request a specific drive torque via a control element 103, for example via an accelerator pedal. The control signal generated by the control element 103 can be evaluated by a (control) device 101 (e.g., processor) of the vehicle 100, and the device 101 can cause the electric machine 102 to generate the requested drive torque. The electric machine 102 can be operated in order to drive the vehicle 100 in order to regenerate electric energy in the scope of the vehicle deceleration and/or to limit the wheel slip of the one or more wheels 104 of the vehicle 100.

During the operation of the vehicle 100, vibrations and/or effects may occur that are perceptible and/or audible to the driver and/or to a passenger of the vehicle 100. The system "wheel-wheel guide-drive-overall vehicle" capable of vibrating is usually excited here to a vibration by the roadway 110, on which the vehicle 100 drives. The forces acting from the roadway 110 can act here on the vehicle 100 vertically, in the longitudinal direction, and/or from the side.

The above-mentioned system capable of vibrating is typically designed for vibration. Impedance masses and/or vibration dampers can be used here in order to tune the system. Furthermore, hydraulically damped rubber mounts can be used in order to contain vibrations, or structural rigidities in the system can be increased.

The above-mentioned vibration-related measures are typically linked with a comparatively high expenditure (with respect to costs, weight, and/or installation space).

Figure 2:
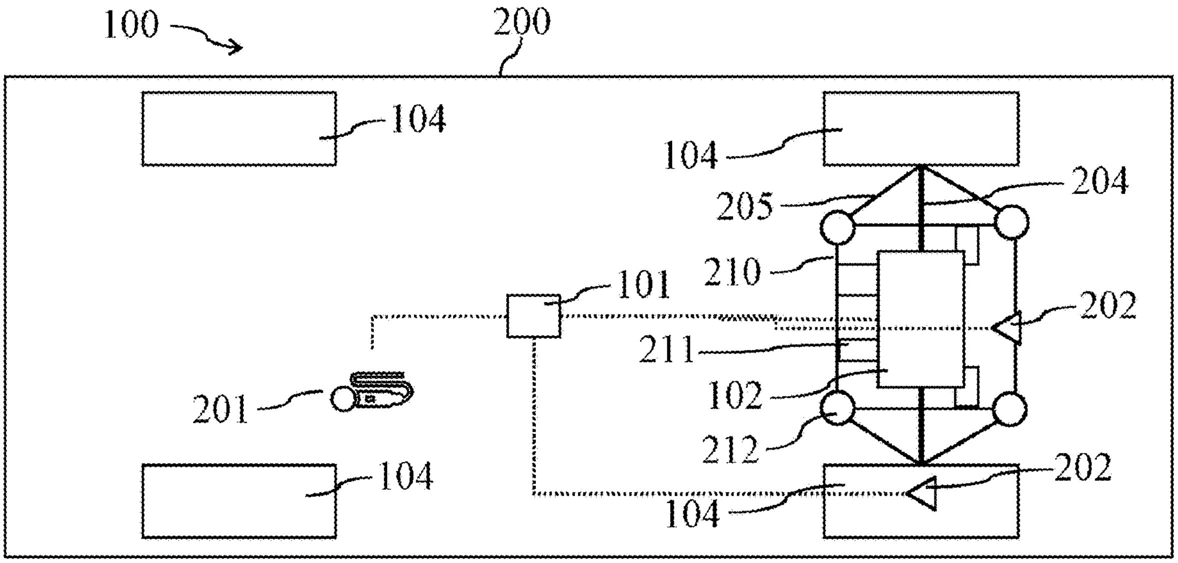
FIG. 2 shows an exemplary mounting of the electric drive machine of a vehicle.

FIG. 2 shows the body 200 of a vehicle 100 in a top view. The electric machine 102 can be mechanically attached to the body 200 via a (rear) axle support 210. The electric machine 102 can be attached here to the axle support 210 (for example in all three spatial directions) via one or more first bearings 211. Furthermore, the axle support 210 can be attached to the body 200 (for example in all three spatial directions) via one or more second bearings 212. The one or more wheels 104 of the vehicle 100 are fastened via in each case a wheel suspension 205 on the axle support 210. Furthermore, the one or more wheels 104 are mechanically coupled via a wheel axle 204 to the electric machine 102, so that a drive torque can be transmitted to the one or more wheels 104 via the wheel axle 204 and/or so that a regenerative torque can be transmitted to the electric machine 102 via the wheel axle 204.

The vehicle 100 can comprise one or more vibration sensors 201, 202, which are configured to acquire vibration data with respect to a vibration of a vehicle component (such as a sheet metal or plastic part). Exemplary vibration sensors 201, 202 are a microphone 201 and/or an acceleration sensor 202. The microphone 201 can be arranged, for example, in or on the passenger compartment of the vehicle 100. An acceleration sensor 202 can be arranged, for example, on the axle support 210 and/or on a wheel suspension 205 and/or on the electric machine 102.

The (control) device 101 can be configured to operate the electric machine 102 as a function of the vibration data. In particular, a compensation torque to be delivered by the electric machine 102 can be determined here, which is designed to reduce and/or at least partially compensate for the vibration of a vehicle component indicated by the vibration data. The compensation torque can have a specific amplitude and/or a specific frequency, at which the compensation torque oscillates around a zero point. The frequency of the compensation torque can depend here on the frequency of the vibration of the vehicle component. The frequency of the compensation torque is typically greater than 10 Hz, for example between 10 and 60 Hz, and possibly also greater than 60 Hz.

Figure 3A:
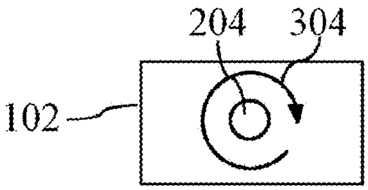
FIG. 3*a* shows exemplary vibrations of an electric drive machine around the motor axis.

As described further above, the electric machine 102 is mounted (indirectly via the axle support 210) on the body 200 of the vehicle 100. FIG. 3*a* shows the electric machine 102 in a side view along the wheel or motor axis 204 (for example along the transverse axis of the vehicle 100). A rotating and/or pitching vibration 304 of the electric machine 102 around the axis 204 can be excited by a chronologically varying compensation torque, which can be transmitted via the mounting of the electric machine 102 to the body 200 of the vehicle 100, in order to reduce the vibration of a vehicle component.

Figure 3B:
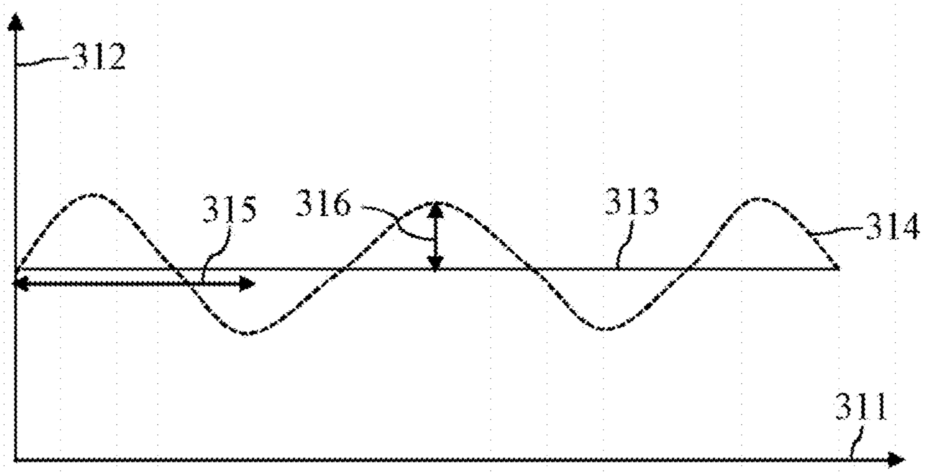
FIG. 3*b* shows an exemplary superposition of the drive torque with a compensation torque.

FIG. 3*b* shows the (overall) torque 312 caused by the electric machine 102 as a function of the time 311. The electric machine 102 can be designed to effect a specific driving operation torque 313 for the driving operation of the vehicle 100. The driving operation torque 313 can correspond in a drive phase of the vehicle 100 to a (positive) drive torque (requested by the driver or by a driving function for the automated longitudinal guidance of the vehicle 100). In a regeneration phase, the driving operation torque 313 can correspond to a (negative) regeneration torque in order to decelerate the vehicle 100.

The driving operation torque 313 can be superimposed with a compensation torque 314, wherein the compensation torque 314 vibrates with a specific amplitude 316 and/or with a specific period duration 315 (or frequency) around the driving operation torque 313. A rotating and/or pitching vibration 304 of the electric machine 102 can be caused by the superimposed compensation torque 314 in order to reduce a detected vibration of a vehicle component.

Figure 3C:
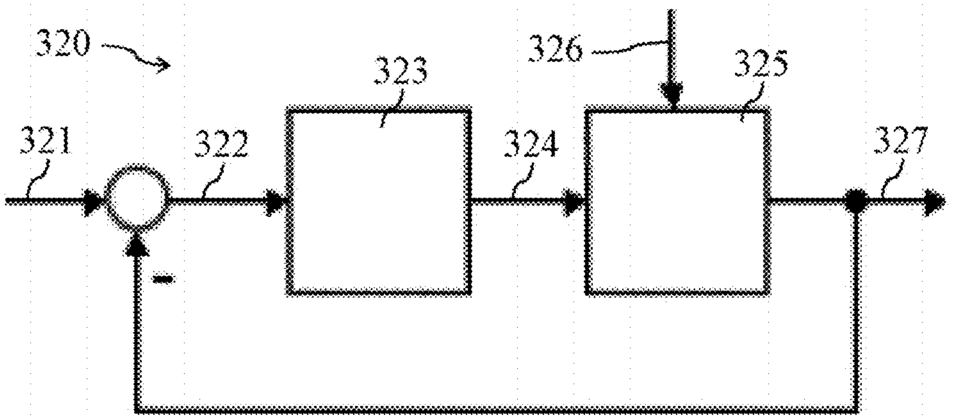
FIG. 3*c* shows an exemplary control loop for setting the compensation torque; and, FIG. 4 shows a flow chart of an exemplary method for reducing the vibrations of a vehicle component.

FIG. 3*c* shows an exemplary control loop 320 for setting one or more parameters 315, 316 (in particular the amplitude 316 and/or the period duration or frequency 315) of the compensation torque 314. The device 101 can be configured to specify target values 321 for one or more properties (such as the amplitude and/or the vibration energy) of a detected vibration of a vehicle component. Actual values 327 for the one or more properties of the vibration of the vehicle component can be determined on the basis of the vibration data. A control error 322 can be determined by comparing the actual values 327 to the target values 321 of the one or more vibration properties.

One or more manipulated variables 324 can be determined based on the control error 322 by way of a controller 323 (such as a P(roportional), I(ntegral), and/or D(ifferential) controller). The one or more manipulated variables 324 can comprise or be parameter values for the one or more parameters 315, 316 of the compensation torque 314. The electric machine 102 can then be operated as a function of the one or more manipulated variables 324. In particular, the electric machine 102 can be prompted to effect a compensation torque 314 which has the ascertained parameter values for the one or more parameters 315, 316.

The compensation torque 314 effected by the electric machine 102 has an influence on the vibration system "wheel to passenger compartment" of the vehicle 100 (i.e., on the controlled system 325), on which typically one or more interference variables 326 act (such as the travel wind), and thus effects the actual values 327 for the one or more properties of the vibration of the vehicle component.

The control shown in FIG. 3*c* can be executed repeatedly, in particular periodically, at a specific control frequency in order to effect a permanent reduction of vibrations.

The frequency of the compensation torque effected by the electric machine 102 is preferably higher than a specific minimum frequency (for example of 10 Hz), wherein the minimum frequency depends on the inertia of the system between drive axle 204, wheel 104, and roadway surface. The minimum frequency can typically be lowered with increasing inertia of the system.

The maximum possible amplitude of the compensation torque 314 can depend on the coefficient of friction between the one or more (driven) wheels 104 and the roadway 110. The maximum possible amplitude can typically be increased here with rising coefficient of friction. The coefficient of friction can be determined on the basis of the sensor data from one or more vehicle sensors.

The electric drive torque 313 of the vehicle 100 can therefore be superimposed with a higher-frequency drive torque vibration 314 for active damping for the overall vibrating system. The acoustics and/or vibrations can be optimized here by targeted control and/or regulation of the overall drive torque 313, 314 of the one or more electric drive units 102.

In the vehicle 100, vibrations can be detected in one or more specific frequencies, for example, by a microphone 201 in the interior and/or by one or more (optionally present) sensors 202 (for example, on a chassis component, a drive component, and/or on a body component). For example, a hum (for example at approximately 45 Hz) can be detected, which is transmitted by specific vibration forms of the wheel/axle/drive composite to the body 200 and to the interior of the vehicle 100.

The total drive torque 313, 314 generated by the one or more drive units 102 can transmit deliberately superimposed drive torque variations 314 in the required frequency to the overall vibrating system. An optimized vibration behavior having improved interior acoustics can be achieved by tuning system frequencies and/or by vibration damping. The amplitude 316 and/or the frequency of the superimposed drive torque 314 are variably settable but are typically limited here by the wheel slip. Matching with the tire slip control can take place in the scope of the setting of the superimposed drive torque 314 in order to ensure particularly stable driving operation of the vehicle 100.

As described by way of example in FIG. 2, the electric machine 102 can be elastically mounted in the rear axle support 210. A road excitation can result in a pitching vibration of the rear axle support 210 with the electric machine 102 (around the rear axle 204). Noises and/or perceptible vibrations can arise due to this pitching vibration. The interior acoustic level can be detected using an (optionally present) microphone 201 (for example using the microphone for the hands-free system). For example, the microphone level can be used as a control variable. A frequency analysis of the detected microphone signal can be carried out. Furthermore, the controller 323 of the electric machine 102 can be used in the scope of a regulation. The superimposed drive torque 314 can be used in frequency and/or amplitude 316 as a manipulated variable 324. The controlled system 325 can be formed by the overall vibrating system from tires to interior of the vehicle 100.

The interior level resulting due to the pitching vibrations of the axle support 210 including drive machine 102 can be deliberately regulated out by the measures described in this disclosure. An acceleration sensor 202 (for example, on the rear axle support 210 or on the electric machine 102) can be used here to acquire the actual value 327 of the vibrations.

The vehicle 100 can have a wheel hub motor as an electric drive machine 102. In this case, the wheel vibrations of the wheel 104, on which the wheel hub motor is arranged, can be used as a control variable. The acquisition of the vibrations can be carried out by an acceleration sensor 202 close to the wheel (for example, by an acceleration sensor 202 on the wheel carrier). The superposition of a compensation torque 314 can be used to reduce a longitudinal vibration of the wheel-axle composite. The vibration can be detected by one or more acceleration sensors 202 on the wheel carrier. A deliberate application of variations of the total drive torque 313, 314 can then be effected in order to damp and/or absorb the vibration.

Figure 4:
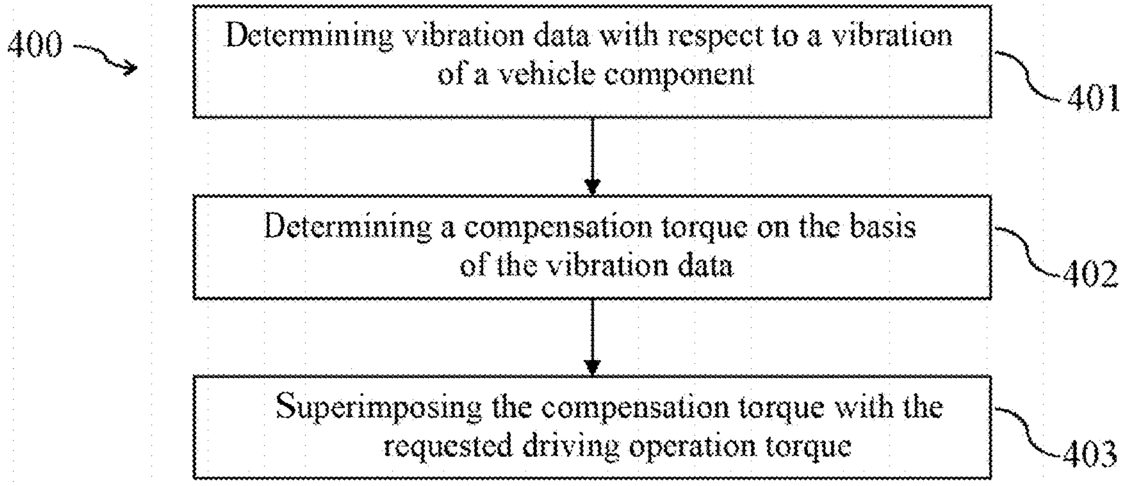

FIG. 4 shows a flow chart of a (possibly computer-implemented) method 400 for reducing a vibration of a vehicle component of a vehicle 100. The vehicle component can execute a vibration which is perceptible, in particular audible, by a user of the vehicle 100. The vehicle component can be excited to a vibration by the roadway 110 traveled by the vehicle 100.

The vehicle 100 comprises at least one electric drive machine 102. The electric machine 102 can be mounted on an axle support 210 or on a wheel carrier of the vehicle 100. Furthermore, the electric machine 102 can be designed to transmit a vibration (in particular a pitching or rotating vibration 304 around the axle 204 of the machine 102) via the respective support 210 to the body 200 of the vehicle 100. Alternatively or additionally, the electric machine 102 can be designed to act, via the wheel 104 coupled to the electric machine 102 inside the drivetrain, against the excitations of the vibration of the vehicle component acting from the roadway 110 and/or the vibration 304 of the drive machine 102.

The method 400 comprises determining 401 vibration data with respect to the vibration of the vehicle component (by way of one or more vehicle sensors 201, 202). The vibration data can indicate the amplitude and/or the frequency and/or the level of the vibration of the vehicle component. The vehicle component can comprise or be the electric machine 102. Alternatively, the vehicle component can be a different component than the electric machine 102.

The method 400 furthermore comprises determining 402, on the basis of the vibration data, a compensation torque 314 for reducing the vibration of the vehicle component. The compensation torque 314, in particular one or more parameters 315, 316 of the compensation torque 314, can be determined and/or set by way of a controller 323. The control can be designed here to reduce the amplitude and/or the level of the vibration of the vehicle component indicated by the vibration data.

Furthermore, the method 400 comprises causing 403 a total torque to be delivered by the drive machine 102, which comprises the driving operation torque 313 to be delivered for the driving operation of the vehicle 100, which is superimposed with the compensation torque 314. The total torque can in particular be the superposition and/or the sum of the driving operation torque 313 and the compensation torque 314.

Vibrations of a vehicle component can be damped and/or absorbed in an efficient and reliable manner by the measures described in this disclosure.

The present disclosure is not restricted to the exemplary embodiments shown. In particular, it is to be noted that the description and the figures are only to illustrate the principle of the proposed methods, devices, and systems by way of example.

The invention claimed is:

1. A device for reducing a vibration of a vehicle component of a vehicle, wherein the vehicle comprises at least one electric drive machine, wherein the device is configured to:

determine vibration data with respect to the vibration of the vehicle component, wherein the vibration data indicate an amplitude and a frequency of the vibration of the vehicle component, wherein the vehicle component comprises at least one of a body panel, a trim component, or a passenger compartment surface separate from a drivetrain of the vehicle;

determine a compensation torque for reducing the vibration of the vehicle component on the basis of the vibration data, wherein one or more parameters of the compensation torque are determined as a function of the vibration data, wherein the one or more parameters comprise an amplitude and a frequency of the compensation torque; and, determine, on the basis of the vibration data, one or more actual values of the vibration of the vehicle component and compare them to one or more corresponding target values to determine a control error; and determine, on the basis of the control error, parameter values for the one or more parameters of the compensation torque by way of a controller; and, cause a total torque to be delivered by the drive machine, which comprises a driving operation torque to be delivered for driving operation of the vehicle, which is superimposed with the compensation torque, wherein the compensation torque oscillates at a frequency within a range of 10 to 60 Hz corresponding to a resonance frequency of the vehicle component, and wherein an amplitude and a frequency of the compensation torque are determined such that, due to an inertia of a torque transmission system between the drive machine and a wheel coupled to the drive machine, the compensation torque does not result in a variation of a driving speed of the vehicle.

2. The device according to claim 1, wherein:

the device is configured to determine the vibration data to include information indicating the amplitude and the frequency of the vibration of the vehicle component, and, the vibration data are acquired by way of one or more vehicle sensors comprising at least one of: an acceleration sensor arranged on the vehicle component, a microphone arranged in a passenger compartment of the vehicle, or a sensor arranged on a wheel carrier for a wheel coupled to the drive machine.

3. The device according to claim 1, wherein the device is configured to determine:

wheel slip data with respect to a wheel slip of a wheel coupled to the drive machine; and, the compensation torque as a function of the wheel slip data, such that the wheel slip caused by the compensation torque does not exceed a predefined wheel slip threshold value, wherein the predefined wheel slip threshold value ensures that the compensation torque for vibration reduction does not adversely affect vehicle stability.

4. The device according to claim 1, wherein the device is configured to:

determine coefficient of friction data with respect to a coefficient of friction of a roadway traveled by the vehicle; and, limit an amplitude of the compensation torque as a function of the coefficient of friction data to ensure that the compensation torque for reducing vibration of the vehicle component does not cause wheel slip.

5. The device according to claim 1, wherein:

the driving operation torque is specified by a driver via a control element, and/or by a driving function for automated longitudinal control of the vehicle; and/or, the driving operation torque comprises a drive torque for driving the vehicle and/or a regeneration torque for decelerating the vehicle, wherein the compensation torque is superimposed on the driving operation torque regardless of whether the vehicle is accelerating, decelerating, or maintaining constant speed.

6. The device according to claim 1, wherein:

the drive machine is mounted on an axle support, which is mounted on a body of the vehicle, wherein a rotating vibration of the drive machine around a wheel axle of a wheel coupled to the drive machine is caused by the compensation torque, which vibration is transmitted via a support of the drive machine to the vehicle component to counteract vibration of the vehicle component.

7. A method for reducing a vibration of a vehicle component of a vehicle, wherein the vehicle comprises at least one electric drive machine, wherein the method comprises:

determining vibration data with respect to the vibration of the vehicle component, wherein the vibration data indicate an amplitude and a frequency of the vibration of the vehicle component, wherein the vehicle component comprises at least one of a body panel, a trim component, or a passenger compartment surface separate from a drivetrain of the vehicle;

determining, on the basis of the vibration data, a compensation torque for reducing the vibration of the vehicle component, wherein one or more parameters of the compensation torque are determined as a function of the vibration data, wherein the one or more parameters comprise an amplitude and a frequency of the compensation torque;

determining, on the basis of the vibration data, one or more actual values of the vibration of the vehicle component and comparing them to one or more corresponding target values to determine a control error;

determining, on the basis of the control error, parameter values for the one or more parameters of the compensation torque by way of a controller; and, causing a total torque to be delivered by the drive machine, which comprises a driving operation torque to be delivered for a driving operation of the vehicle, which is superimposed with the compensation torque, wherein the compensation torque oscillates at a frequency within a range of 10 to 60 Hz corresponding to a resonance frequency of the vehicle component, and wherein an amplitude and a frequency of the compensation torque are determined such that, due to an inertia of a torque transmission system between the drive machine and a wheel coupled to the drive machine, the compensation torque does not result in a variation of a driving speed of the vehicle.

* * * * *